US008271592B2

(12) United States Patent
Maltempo

(10) Patent No.: US 8,271,592 B2
(45) Date of Patent: Sep. 18, 2012

(54) METHODS, SYSTEMS, AND COMPUTER PROGRAM PRODUCTS FOR TRANSMITTING MAPS BY MULTIMEDIA MESSAGING SERVICE

(75) Inventor: John Maltempo, New Port Richey, FL (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 663 days.

(21) Appl. No.: 11/948,677

(22) Filed: Nov. 30, 2007

(65) Prior Publication Data
US 2009/0144375 A1 Jun. 4, 2009

(51) Int. Cl.
*G06F 15/16* (2006.01)
(52) U.S. Cl. .................. 709/206; 709/204; 709/246
(58) Field of Classification Search .................. 709/206
See application file for complete search history.

(56) References Cited

U.S. PATENT DOCUMENTS

| 6,934,369 | B2 | 8/2005 | Parker |
| 2001/0021649 | A1* | 9/2001 | Kinnunen et al. ............ 455/412 |
| 2005/0050043 | A1 | 3/2005 | Pyhalammi et al. |
| 2006/0067320 | A1* | 3/2006 | Wahl et al. .................... 370/392 |
| 2006/0291506 | A1 | 12/2006 | Cain |

OTHER PUBLICATIONS

Jari Reini, MMS (Multimedia Messaging Service) enabled web map dispatching solution for location enhanced fieldwork management, Nov. 30, 2007.

* cited by examiner

*Primary Examiner* — Benjamin R Bruckart
*Assistant Examiner* — Shripal Khajuria
(74) *Attorney, Agent, or Firm* — Cantor Colburn LLP

(57) ABSTRACT

Methods, systems, and computer program products for transmitting maps via multimedia messaging service (MMS). The methods, systems, and computer program products include acquiring a map, displaying the map on a display screen of a device, initiating an MMS formatting application to format the map in an MMS format, and transmitting the MMS formatted map over a network.

20 Claims, 5 Drawing Sheets

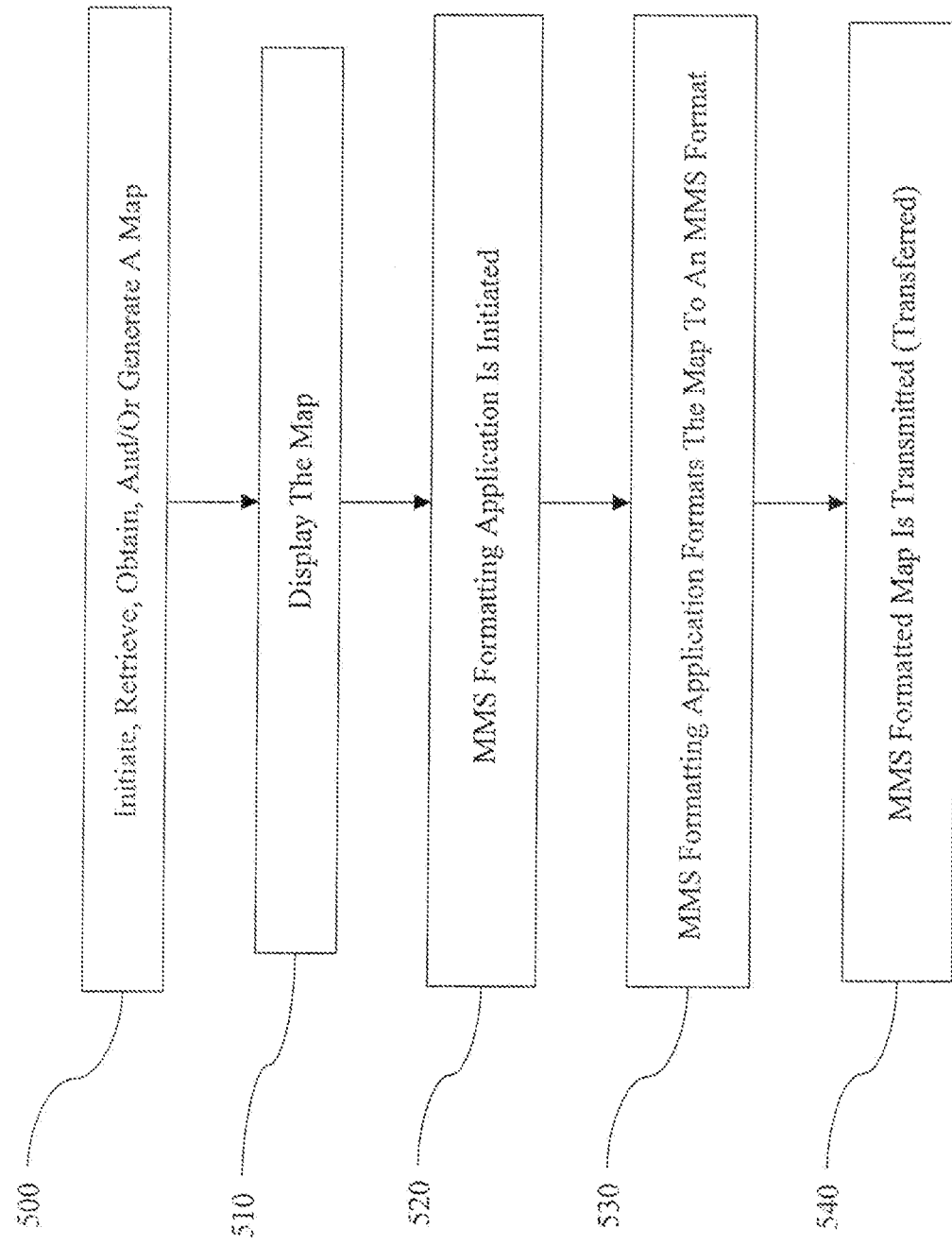

METHODS, SYSTEMS, AND COMPUTER PROGRAM PRODUCTS FOR TRANSMITTING MAPS BY MULTIMEDIA MESSAGING SERVICE

BACKGROUND

Embodiments of the present invention relate generally to multimedia messaging services (MMS), and more particularly, to transmitting maps via MMS.

Multimedia Messaging Service (MMS) is a communications technology developed by Third-Generation Partnership Project (3GPP) that allows users to exchange multimedia communications between capable mobile phones. An extension to the Short Message Service (SMS), MMS defines a way to send and receive, almost instantaneously, wireless messages that include images, audio, and video clips in addition to text.

Generally, MMS is a standard for a telephony messaging systems that allows sending messages which include multimedia objects and not just text as in SMS. It is mainly deployed in cellular networks along with other messaging systems like SMS, Mobile Instant Messaging, and Mobile E-Mail. Its main standardization effort is done by 3GPP, 3GPP2, and Open Mobile Alliance (OMA).

There are two modes of delivery in MMS: immediate or deferred. Immediate delivery occurs when the MMS client on a mobile phone receives the MMS notification, and the MMS client then immediately (without user intervention or knowledge) retrieves the MMS message from the Multimedia Messaging Service Center (MMSC) or Multimedia Messaging Center (MMC) that sent the notification. After retrieval the subscriber (i.e., user) is alerted to the presence of a newly arrived MMS message.

Deferred delivery is when the MMS client alerts the subscriber that an MMS message is available, and allows the subscriber to choose if and when to retrieve the MMS message.

As with the MMS submission, the MMS retrieval request, whether immediate or deferred, occurs with an HTTP request. The MMSC or MMC responds by transmitting the MMS message in an HTTP response to the MMS client, after which the subscriber is finally alerted that the MMS message is available. The essential difference between immediate and deferred delivery is that the former hides the network latencies from the subscriber, while the latter does not. Immediate or deferred delivery are handset dependent modes, which means that the handset manufacturer can provide the handset in one mode or the other or let the user decide his or her preference.

It is desirable to have methods, systems, and computer program products for transmitting maps in an MMS format from, for example, an Internet Protocol enabled television.

BRIEF SUMMARY

Exemplary embodiments include a method of transmitting maps via multimedia messaging service (MMS). The method includes acquiring a map, displaying the map on a display screen of a device, initiating an MMS formatting application to format the map in an MMS format, and transmitting the MMS formatted map over a network.

Additional exemplary embodiments include a system for transmitting maps via multimedia messaging service. The system includes an Internet Protocol enabled (IP) device including a display screen, an MMS formatting application, and a network. The network is communicatively connected to the IP device and the communication device such that media and data are transmitted and received. The display screen of the IP enabled device displays a map, the MMS formatting application formats the map to an MMS format, and the IP enabled device is configured to transmit the MMS formatted map to a mobile device via the network.

Further exemplary embodiments include a computer program product, tangibly embodied on a computer readable medium for transmitting maps via multimedia messaging service. The computer program product includes instructions for causing a computer to execute a method, which includes acquiring a map, displaying the map on a display screen of a device, initiating an MMS formatting application to format the map in an MMS format, and transmitting the MMS formatted map over a network.

Other systems, methods, and/or computer program products according to embodiments will be or become apparent to one with skill in the art upon review of the following drawings and detailed description. It is intended that all such additional systems, methods, and/or computer program products be included within this description, be within the scope of the exemplary embodiments, and be protected by the accompanying claims.

BRIEF DESCRIPTION OF DRAWINGS

Referring now to the drawings wherein like elements are numbered alike in the several FIGURES:

FIG. 5 is a flow chart of a method for transmitting a map using multimedia messaging service (MMS) in accordance with exemplary embodiments.

The detailed description explains the exemplary embodiments, together with advantages and features, by way of example with reference to the drawings.

DETAILED DESCRIPTION OF EXEMPLARY EMBODIMENTS

Figure 1:
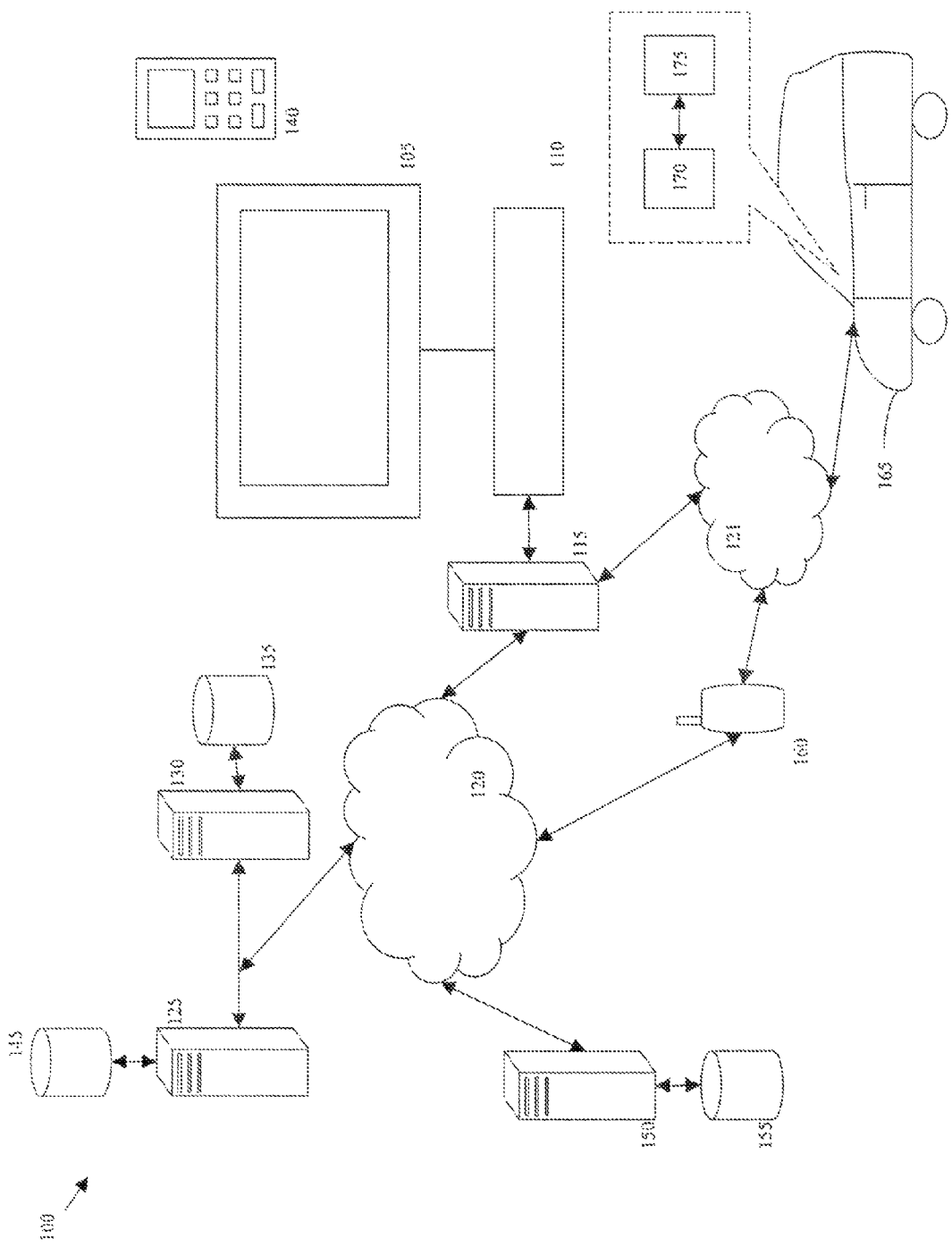
FIG. 1 is a block diagram of systems 100 in accordance with exemplary embodiments.

FIG. 1 illustrates a block diagram of system 100 in accordance with exemplary embodiments. The system 100 provides an infrastructure through which users can access media (including video, audio, data, multimedia messaging, etc.) through a communications device 105, such as an IPTV-enabled television and a set top box 110 configuration. As non-limiting examples, the set top box 110 is capable of operating with Internet enabled services (e.g., in U-verse™), and may transmit and receive media in various formatting and compression schemes.

As non-limiting examples, the set top box 110 may be a type of computer that processes digital information. The set top box 110 can act as a gateway between a television or PC and a telephone, satellite, terrestrial, fiber optic, and/or cable feed (incoming/outgoing signal.) The set top box 110 may receive encoded/compressed digital signals from the signal source (satellite, TV station, cable network, telephone company, terrestrial, etc.) and decode/decompress those signals, converting them into analog signals displayable on an analog television. The set top box 110 accepts commands from the user often via use of a handheld remote control, keypad, voice recognition unit, or keyboard and transmits these commands back to the network (e.g., networks 120, 121) operator through a type of back channel (which may be a separate phone line.)

As non-limiting examples, the set top box 110 makes it possible to receive TV signals, connect to networks (e.g., the networks 120, 121), play games via a game console (which might be built into the set top box 110), and browse networks including the Internet. Also, the set top box 110 makes it possible to interact with Electronic Program Guides (EPG), virtual channels, electronic storefronts, and walled gardens; to send e-mail; and to videoconference. The set top box 110 may be able to communicate in real time with devices such as camcorders, DVDs, CD players, portable media devices and music keyboards, and the set top box 110 may have vast hard-drives and smart card slots to put smart cards into for purchases and identification.

It is understood that, in exemplary embodiments and implementations, the communications device 105 can be a variety of other communications devices such as general-purpose or laptop computers, wireless devices such as cellular telephones, portable computing devices, digital music players (e.g., MP3 players), or mobile devices. In addition, a wireline PSTN telephone, Session Initiation Protocol (SIP) telephone, dual-mode mobile telephone, personal digital assistant (PDA), videophone, or other type of communications device may be included in the system 100 of FIG. 1.

The system 100 can manage multiple accounts as established by particular users (e.g., subscribers). These accounts may then be used to provide access to media services as described further herein. As an IPTV network, the system 100 also includes a remote controller 140 for inputting information and controlling the communications device 105.

According to exemplary embodiments, the system 100 includes the communications device 105 as discussed above, which can be an IPTV enabled television communicatively coupled to the set top box 110, which is in turn communicatively coupled to a server 115 for accessing the networks 120, 121 such as but not limited to the Internet. In exemplary embodiments, the set top box 110 may be operatively connected to the networks 120, 121 and the server 115 may be omitted. The networks 120, 121 may include circuit-switched and/or packet-switched technologies and devices, such as routers, switches, hubs, and gateways (e.g., residential gateways, including a DSL modem, etc.), and an IP multimedia subsystem based network, for facilitating communications between the communications device 105 and a server (e.g., authentication server) 130. The networks 120, 121 may include wireline (e.g., fiber optic lines) and/or wireless components utilizing, e.g., 802.11 standards for providing over-the-air transmissions of communications. The networks 120, 121 can be an IP-based network for communication between a customer service center and clients using the communication device 105 via a broadband connection.

Also, the networks 120, 121 may include wireline and/or wireless components utilizing standards for, e.g., MMS. The networks 120, 121 may include a Multimedia Messaging Center (MMC) or Multimedia Messaging Service Center (MMSC) which implements the network side of MMS, and makes it possible for an operator (or provider) to offer multimedia messaging to their mobile subscribers. The MMC is a highly flexible system, which can be adapted to the needs of the operator and the particular end users involved. The MMC manages different sources of information to/from mobile terminals (e.g., 105, 160 or 170) and supports a wide range of standard MMS interfaces.

In accordance with exemplary embodiments, the networks 120 and 121 may be the same or different networks, and may have the same or different capabilities. Additionally, the networks 120 and 121 can be representative of countless networks.

According to exemplary embodiments, the networks 120, 121 facilitate transmission of media (e.g., images, video, data, maps, multimedia messaging, etc.) from content services provider systems (e.g., a server 150 and a storage 155) to customers via devices, such as the communications device 105, mobile device 160, and communication vehicle device 170, through a broadband connection. As discussed above, the network 121 may or may not be the same as network 120. It the networks 120 and 121 are different, in exemplary embodiments, the communication vehicle device 170 may be in communication with the communication device 105 and the mobile device 160 via the network 121. The communication vehicle device 170 may be a mobile device capable of being used in a vehicle 165.

In accordance with exemplary embodiments, the communication vehicle device 170 is operatively connected to a positioning and/or guidance system 175. Conversely, in exemplary embodiments, the positioning and/or guidance system 175 is operatively connected to the network 121 (or the network 120), and the communication vehicle device 170 may be omitted.

In exemplary embodiments, the networks 120, 121 can be a managed IP network administered by a service provider, which can control bandwidth and quality of service for the communications discussed herein. The networks 120, 121 may be implemented in a wireless fashion, e.g., using wireless protocols and technologies, such as WiFi, WiMax, Bluetooth, etc. The networks 120, 121 can also be a packet-switched network as a local area network, wide area network, metropolitan area network, Internet network, or other similar type of network environment. The networks 120, 121 may be a cellular communications network, a fixed wireless network, a wireless local area network (LAN), a wireless wide area network (WAN), a personal area network (PAN), a virtual private network (VPN), an intranet or other suitable network system, which includes equipment for receiving and transmitting signals such as a cell tower and mobile switching center. In another exemplary embodiment, the networks 120, 121 can be a circuit-switched network such as a standard public switched telephone network (PSTN).

As further shown in FIG. 1, a (host) server 125 is in communication with the (authentication) server 130 and the communications device 105 via the network 120. The host (e.g., media) server 125 may be implemented using a high-speed processing device (e.g., a computer system, etc.) that is capable of handling high volume activities conducted via the communications device 105 and other network entities (e.g., the authentication server 130). The host server 125 may be implemented by a network service provider, a content service provider, a media service provider, an MMC, or any other enterprise. Similarly, the (authentication) server 130 may be implemented using a high-speed processing device (e.g., a computer system, etc.) that is capable of handling high volume activities conducted via the communications device 105, and other network entities (e.g., the server 125, server 150, a storage 135, a storage 145, storage 155) via the network 120. According to exemplary embodiments, the authentication server 130 receives requests from the communications device 105 either to establish a media services account or to access network services (e.g., to access media). The authentication server 130 may implement authentication software for restricting or controlling access to (media) network services provided by the host server 125.

As discussed above, the communications device 105 may be an Internet Protocol-enabled television (IPTV). In exemplary embodiments, the user can establish an account using devices associated with the user. For example, the communications device 105 can enable the establishment of an account that is managed by the provider enterprise of the host server 125. As such, the communications device 105 may receive Internet services from the provider enterprise of the host server 125.

Furthermore, exemplary embodiments are not limited to but are capable of being implemented in the system 100 illustrated in FIG. 1. Additionally, the servers 115, 125, 130, and 150 may be representative of numerous, varied servers. The storages devices 135, 145, and 155 may be representative of numerous, varied storage devices. Likewise, the networks 120 and 121 may be representative of numerous, varied networks and systems. Therefore, the system 100 illustrated in FIG. 1 is neither limited numerically to the elements depicted therein nor limited to the exact configuration and operative connections of elements. Further, it is understood by those skilled in the art that elements may be added to, subtracted from, or substituted for the elements described in the system 100 of FIG. 1.

Figure 2:
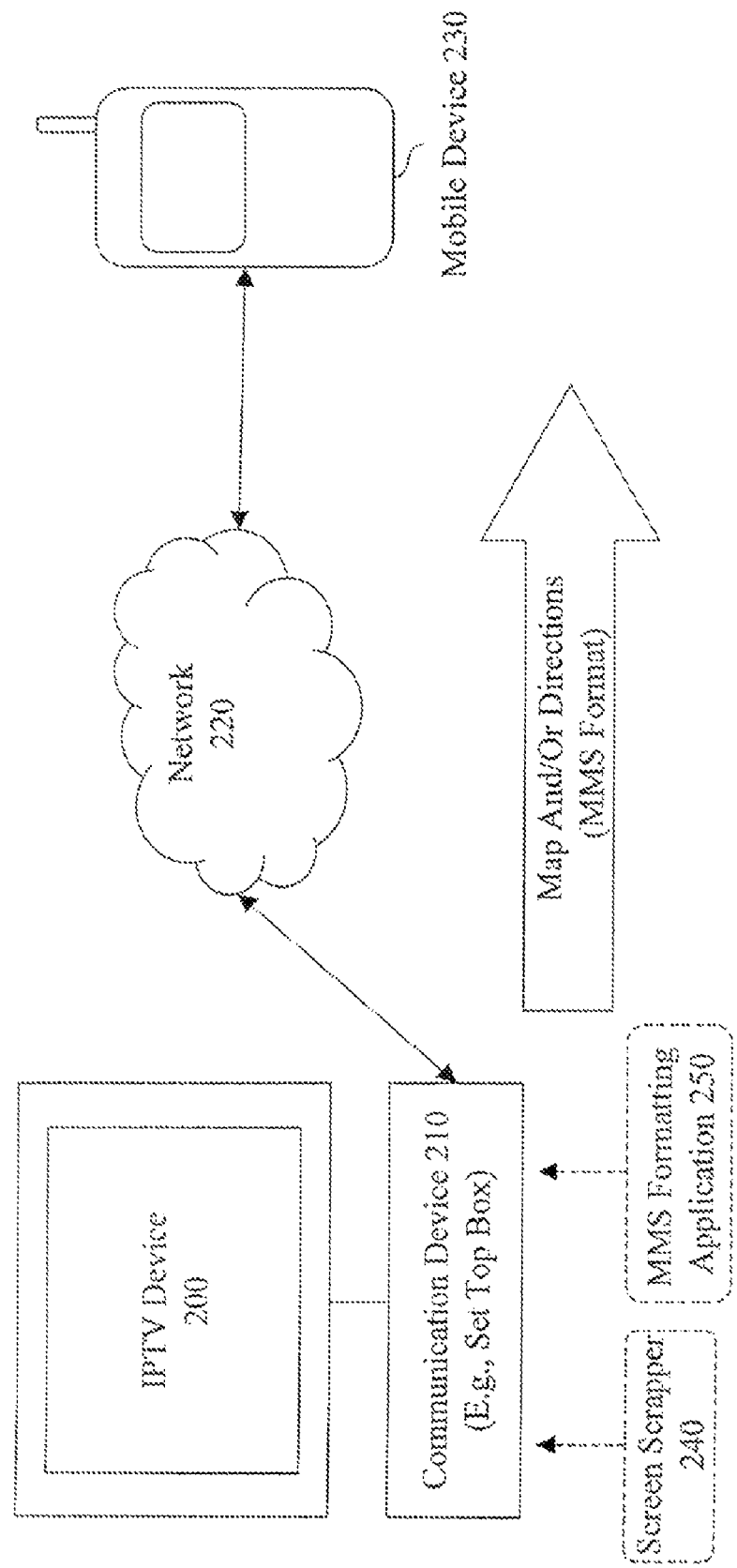
FIG. 2 is a block diagram of a system for transmitting a map in multimedia messaging service (MMS) format in accordance with exemplary embodiments.

FIG. 2 is a block diagram of a system for transmitting a map in multimedia messaging service (MMS) format in accordance with exemplary embodiments. In accordance with exemplary embodiments, an IPTV device 200 is operatively connected to a communication device 210, which may be a set top box. The communication device 210 and a mobile device 230 are operatively connected to a network 220. In exemplary embodiments, the IPTV device 200 may be operatively connected to the network 220, and the communication device 210 may be omitted.

According to exemplary embodiments, the IPTV device 200 and communication device 210 are capable of extracting information, such as directions and maps displayed on the IPTV device 200. As non-limiting examples, information may be extracted from media transmitted by the IP-enabled network 220. In accordance with exemplary embodiments, a screen scraper may be used to extract information (e.g., maps and addresses) from a screen (e.g., a webpage or any type of media) viewed on the IPTV device 200. As non-limiting examples, a screen scraper 240 or screen scraping may be known as data scraping, data extraction, web scraping, page scraping, web page wrapping, and HTML, scraping. Screen scraping is a technique, by way of non-limiting examples, in which a computer program extracts data from the display output of another program.

Exemplary embodiments are not limited to using a screen scraper to extract information, and various methods and techniques may be used to retrieve or extract information. As non-limiting examples to retrieve or extract information, the information may be downloaded, saved, clicked on and dragged, or cut and pasted. According to exemplary embodiments, the extracted (information) maps, directions, and/or images are converted to an MMS format and transmitted from the IPTV device 200 and communication device 210 to the mobile device 230 via the network 220. The conversion to an MMS format may be by an application of the IPTV device 200 and communication device 210. As non-limiting examples, an MMS formatting application 250 may be stored on the IPTV device 200 and/or communication device 210. Also, in non-limiting examples, the network 220 may store the MMS formatting application 250 and make the MMS formatting application 250 available to the user of the IPTV device 200. Accordingly, the conversion to an MMS format may be seamless to the user. Conversely, in exemplary embodiments, the conversion to an MMS format may be by an MMC or MMSC.

In exemplary embodiments, the map (for example) received by the mobile device 230 is static, and in exemplary embodiments, the map is interactive. In exemplary embodiments the map is transmitted to the mobile device 220 as a multimedia message and does not require the mobile device 230 to request that the map be downloaded from a website (such as e.g., a map search engine) before the map is displayed. In non-limiting examples, the map (or directions) transmitted by the communication device 210 (e.g., a set top box) to the mobile device 230 is not a link to a map website, which would require the mobile device 230 to access the map website to display the map. As such, the map can be viewed on the mobile device 230 without requiring access to the Internet. Furthermore, the map may be transmitted in an MMS format from a general-purpose computer, or videophone.

In accordance with exemplary embodiments, the map is MMS formatted by the MMS formatting application 250 stored in the IPTV device 200 and/or communication device 210. As such, the MMS formatted map is not required to be transmitted to the MMC or MMSC for formatting. Thus, in exemplary embodiments, the IPTV device 200 and communication device 210 transmit the MMS formatted map directly to the mobile device 230 via the network 220. Moreover, it is understood that the network 220 comprises many network elements that facilitate transmission of the MMS formatted map from the IPTV device 200 to mobile device 230.

Figure 3:
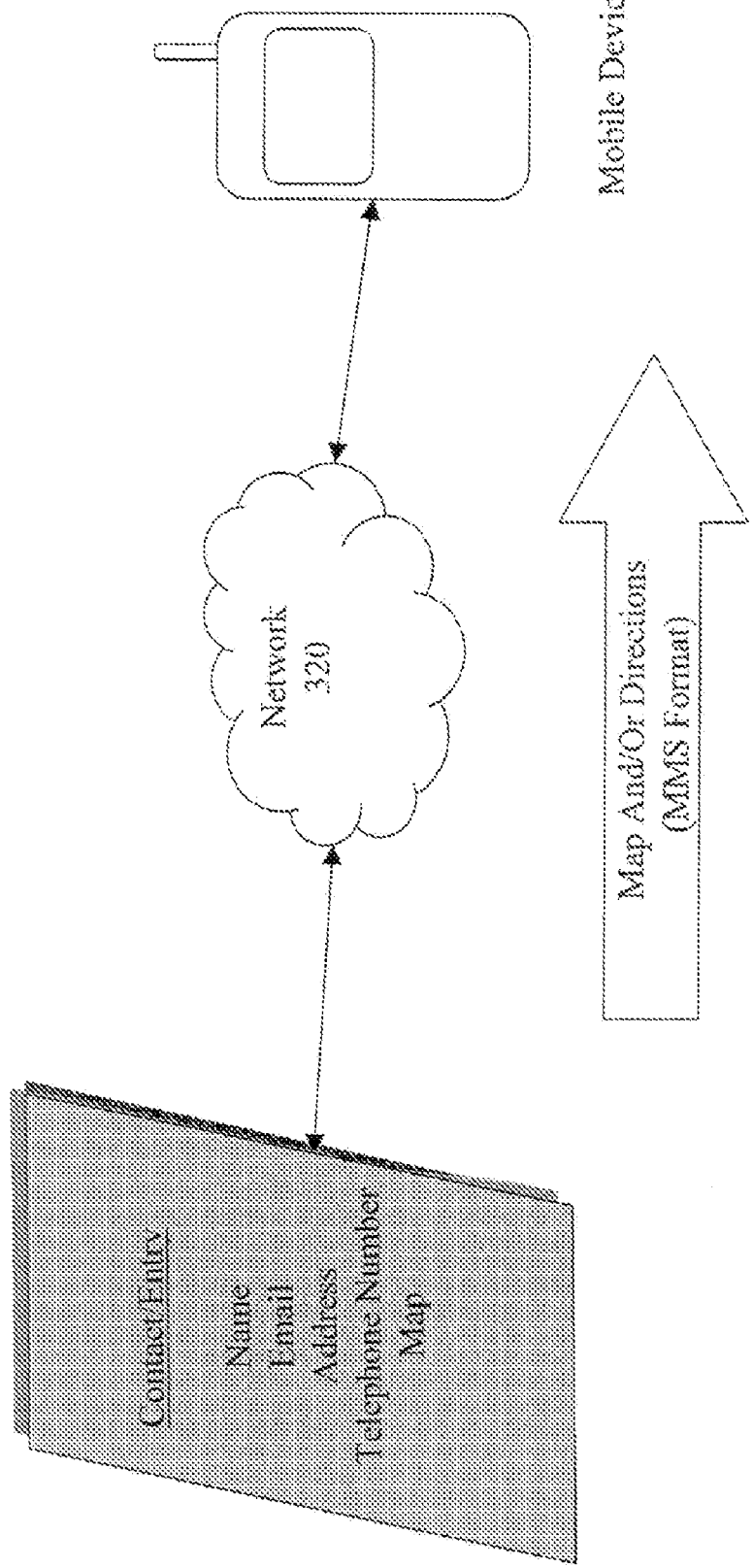
FIG. 3 is a block diagram of a system for transmitting information from an address book to a mobile device in multimedia messaging service (MMS) format in accordance with exemplary embodiments.

FIG. 3 is a block diagram of a system for transmitting information from an address book 310 to a mobile device 330 in multimedia messaging service (MMS) format in accordance with exemplary embodiments. The address book 310 is a source of various information about a contact/entry, and a user may access the information in the address book 310 when needed.

In accordance with exemplary embodiments, information such as maps, directions, and/or addresses may be extracted from address book 310. The extracted information is formatted by an MMS formatting application and is sent over a network 320 to the mobile device 330 in an MMS format. The mobile device 330 can display and utilize the addresses, directions, and/or maps corresponding to the contact/entry of the address book 310. Additionally, if the mobile device 330 has positioning and/or guidance capabilities, the directions, and/or maps from address book 310 can be used to navigate to a particular location. As non-limiting examples, a PC may access the address book 310 and use a stored MMS formatting application to format any information extracted from the address book 310.

In exemplary embodiments, the address book 310 may be a networked address book that is stored on a network (e.g., saved on a server and/or storage device, such that the networked address book may be accessed via the network 320). As non-limiting examples, a provider (e.g., an Internet provider, cable provider, cell phone provider) supports the networked address book 310, and the provider maintains adequate storage and memory for the networked address book. The networked address book can be accessed by the IPTV device 105, the set top box 110, and/or PC. The IPTV device 105, set top box 110, and/or PC can cause the information such as maps to be transmitted over the network 320 to the mobile device 330 in an MMS format. As non-limiting examples, the IPTV device 105 may have an MMS formatting application (e.g., 250) that converts the map into an MMS format. The IPTV device 105 transmits the converted map in MMS format to the mobile device 330.

Figure 4:
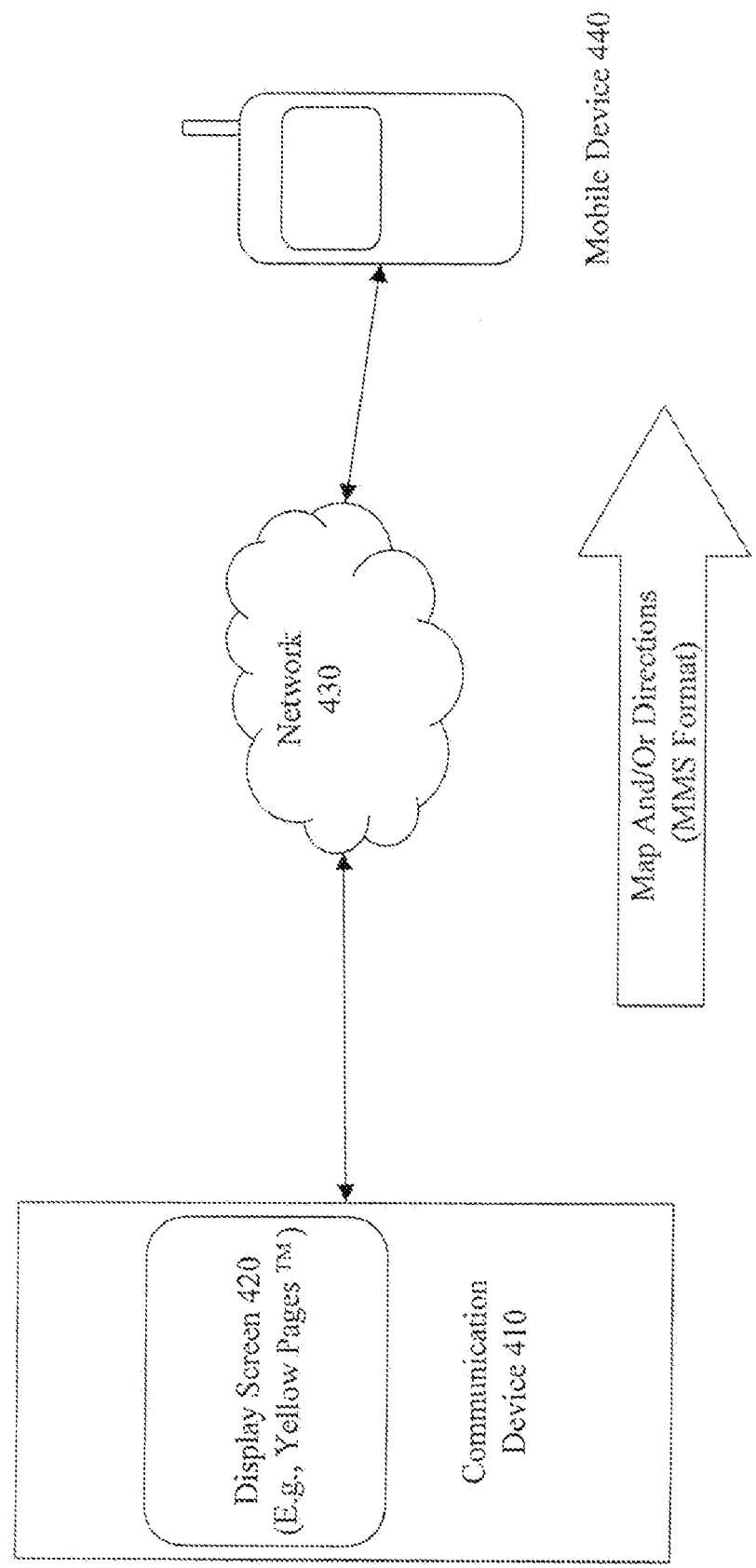
FIG. 4 is a block diagram of a system for transmitting information to a mobile device in accordance with exemplary embodiments.

FIG. 4 is a block diagram of a system for transmitting information to a mobile device 440 in accordance with exemplary embodiments. In accordance with exemplary embodiments, a communication device 410 comprises or is operatively connected to a display screen 420. The communication device 410 and the mobile device 440 are operatively connected to a network 430.

In accordance with exemplary embodiments a screen scraper may be used to extract information (e.g., maps, addresses) from a screen or a webpage displayed on the display screen 420. The extracted information is MMS formatted, e.g., by an MMS formatting application of the communication device 410, and the MMS formatted information is transmitted to the mobile device 440 over the network 430.

In accordance with exemplary embodiments, a webpage (e.g., Yellow Pages™) may be displayed on the display screen 420. Information is extracted from the webpage (e.g., by a screen scraper) or a go to button (that retrieves or acquires information) may be clicked on the webpage. The communication device 410 may convert the extracted information to an MMS format and transmits the MMS formatted information to the mobile device 440.

As non-limiting examples, the information may be a map extracted from the Yellow Pages™, and the map may be formatted by an MMS formatting application on an IPTV device, such as the IPTV device 105, or on a set top box, such as the set top box 110, in accordance exemplary embodiments. Conversely, in exemplary embodiments, the map may already be formatted in an MMS format when extracted or may be transmitted to an MMC for MMSC formatting.

FIG. 5 is a flow chart of a method of transmitting a map using multimedia messaging service (MMS) in accordance with exemplary embodiments. A map is initiated, retrieved, obtained, and/or generated at 500. The map is displayed on a display screen of a device at 510. An MMS formatting application is initiated at 520. The MMS formatting application formats the map to an MMS format at 530. The MMS formatted map is transmitted over a network at 540. In accordance with exemplary embodiments, the device includes the MMS formatting application, and the device may be a general-purpose computer, an IP enabled television, and/or a videophone.

In accordance with exemplary embodiments, the device is an Internet Protocol enabled (IP) device communicatively coupled to a set top box, and the IP device transmits the MMS formatted map over the network via the set top box. In exemplary embodiments, the MMS formatting application is stored on the IP device and/or the set top box, and the map is MMS formatted by the MMS formatting application of the IP device and/or the set top box before being transmitted over the network. In exemplary embodiments, the MMS formatted map is transmitted to a mobile device, such that the MMS formatted map is displayed on the mobile device without having to access a map website or a link to a map website. The user of the mobile device is able to view the MMS formatted map as he or she would normally view an MMS message.

In accordance with exemplary embodiments, acquiring the map may include downloading the map from a map website, downloading the map from a business search engine website, downloading the map from a residential search engine website, executing a screen scraper to extract the map, and extracting the map from an address book.

In exemplary embodiments, the network may store the MMS formatting application such that the device can access the MMS formatting application stored on the network to format the map. Furthermore, the providers (e.g., network providers) may store a networked address, which can be accessed by a user. The user can extract and MMS format information from the networked address book.

As described above, the exemplary embodiments can be in the form of computer-implemented processes and apparatuses for practicing those processes. The exemplary embodiments can also be in the form of computer program code containing instructions embodied in tangible media, such as floppy diskettes, CD ROMs, hard drives, or any other computer-readable storage medium, wherein, when the computer program code is loaded into and executed by a computer, the computer becomes an apparatus for practicing the exemplary embodiments. The exemplary embodiments can also be in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into an executed by a computer, the computer becomes an apparatus for practicing the exemplary embodiments. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed for carrying out this invention, but that the invention will include all embodiments falling within the scope of the claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A method of transmitting maps via multimedia messaging service, comprising:

acquiring, by a television, a map for display on the television;

displaying, by the television, the map on a display screen of the television;

initiating, by the television, a multimedia messaging service formatting application to format the map on the display screen of the television into a multimedia messaging service formatted map, wherein the multimedia messaging service formatting application resides on the television; and transmitting, by the television, the multimedia messaging service formatted map over a network to a communication vehicle device;

wherein the multimedia messaging service formatted map transmitted from the television to the communication vehicle device is the map previously displayed on and acquired by the television;

wherein acquiring the map comprises executing a screen scraper on a set top box to extract the map from an address book; and wherein the screen scraper is configured to extract directions and addresses from the address book.

2. The method of claim 1, wherein the television incorporates a set top box, and
wherein the set top box transmits the multimedia messaging service formatted map over the network.

3. The method of claim 2, wherein the multimedia messaging service formatting application is stored on the set top box.

4. The method of claim 2, wherein the map is multimedia messaging service formatted by the multimedia messaging service formatting application of the set top box before being transmitted over the network.

5. The method of claim 1,
wherein the address book comprises contact entries and the contact entries comprise the map, the directions, and the addresses;
wherein the multimedia messaging service formatting application formats the directions and the addresses for transmitting to the communication vehicle device.

6. The method of claim 1, wherein the multimedia messaging service formatted map is transmitted to the communication vehicle device, such that the multimedia messaging service formatted map is displayed on the communication vehicle device without a user of the communication vehicle device having to access a map website.

7. The method of claim 1, wherein the television comprises the multimedia messaging service formatting application, and
wherein the television is an internet protocol enabled television.

8. The method of claim 1, wherein when the network stores the multimedia messaging service formatting application, the television can access the multimedia messaging service formatting application stored on the network to format the map.

9. A system configured for transmitting maps via multimedia messaging service, comprising:
a television;
a display screen of the television; and
a multimedia messaging service formatting application on the television;
wherein:
the display screen is configured to display a map on the television,
the multimedia messaging service formatting application on the television is configured to format the map displayed on the television into a multimedia messaging service formatted map, and
the television is configured to transmit the multimedia messaging service formatted map to a communication vehicle device via a network;
wherein the multimedia messaging service formatted map transmitted from the television to the communication vehicle device is the map previously displayed on and acquired by the television;
wherein acquiring the map comprises executing a screen scraper on a set top box to extract the map from an address book; and
wherein the screen scraper is configured to extract directions and addresses from the address book.

10. The system of claim 9, wherein:
the television is communicatively connected to the set top box,
the television is configured to utilize the set top box as an intermediary between the television and the network, and
the television is configured to transmit the multimedia messaging service formatted map by way of the set top box to the communication vehicle device via the network.

11. The system of claim 9, wherein the multimedia messaging service formatting application is adapted to be stored on the television and the network.

12. The system of claim 9, wherein, responsive to the television transmitting the multimedia messaging service formatted map to the communication vehicle device, the multimedia messaging service formatted map is configured to be displayed on the communication vehicle device without a user of the communication vehicle device having to access a map website.

13. A computer program product, tangibly embodied on a non-transitory computer readable medium, for transmitting maps via multimedia messaging service, the computer program product including instructions for causing a television to execute a method, comprising:
acquiring, by the television, a map for display on the television;
wherein acquiring the map comprises executing a screen scraper on a set top box to extract the map from an address book; and
wherein the screen scraper is configured to extract directions and addresses from the address book
displaying, by the television, the map on a display screen of the television;
initiating, by the television, a multimedia messaging service formatting application to format the map on the display screen of the television into a multimedia messaging service formatted map, wherein the multimedia messaging service formatting application resides on the television; and
transmitting, by the television, the multimedia messaging service formatted map over a network;
wherein the multimedia messaging service formatted map transmitted from the television to the communication vehicle device is the map previously displayed on and acquired by the television.

14. The computer program product of claim 13, wherein the television is an internet protocol enabled device communicatively connected to the set top box, and
wherein the internet protocol enabled device transmits the multimedia messaging service formatted map over the network via the set top box.

15. The computer program product of claim 14, wherein the multimedia messaging service formatting application is stored on the internet protocol enabled device.

16. The computer program product of claim 14, wherein the map is multimedia messaging service formatted by the multimedia messaging service formatting application of the internet protocol enabled device before being transmitted over the network.

17. The computer program product of claim 13, wherein acquiring the map comprises the television being configured for downloading the map from a map website, downloading the map from a business search engine website, downloading the map from a residential search engine website, executing a screen scraper to extract the map, and extracting the map from an address book.

18. The computer program product of claim 13, wherein the multimedia messaging service formatted map is transmitted by the television to a communication vehicle device, such that the multimedia messaging service formatted map is displayed on the communication vehicle device without having to access a map website.

19. The computer program product of claim 13, wherein the television comprises the multimedia messaging service formatting application, and
  wherein the television is an internet protocol enabled television.

20. The computer program product of claim 17, wherein the address book comprises contact entries and the contact entries comprise the map, the directions, and the addresses.

* * * * *